United States Patent
Strozyk

[11] 3,766,490
[45] Oct. 16, 1973

[54] LU:ND:YAG LASER SYSTEM AND MATERIAL

[75] Inventor: John W. Strozyk, West Long Branch, N.J.

[73] Assignee: The United States of America as represented by the Secretary of the Army, Washington, D.C.

[22] Filed: Mar. 14, 1972

[21] Appl. No.: 234,502

[52] U.S. Cl. .............................. 331/94.5, 252/301.4
[51] Int. Cl. .......................... H01s 3/16, H01s 3/09
[58] Field of Search .................. 331/94.5; 252/301.4

[56] References Cited
UNITED STATES PATENTS
3,483,481   12/1969   Church et al. ..................... 331/94.5

OTHER PUBLICATIONS
Kbstigian et al., 1st quarterly report contract No. DAAB07-67-c-0562. Dec., 1967, title page and pages 1–9.

Primary Examiner—David Schonberg
Assistant Examiner—R. J. Webster
Attorney—Harry M. Saragovitz et al.

[57] ABSTRACT

A laser system having an elliptical laser cavity with a laser rod and a broadband pump source mounted in the laser cavity. The laser rod is a co-doped Lu:Nd:YAG crystal having a Lu/Nd atomic ratio in the range from 2.0 to 2.4 distributed in the YAG host crystal. Because the laser rod absorbs a relatively small amount of radiation which does not contribute to population inversion, the laser system has no filters or absorbers.

1 Claim, 1 Drawing Figure

PATENTED OCT 16 1973    3,766,490
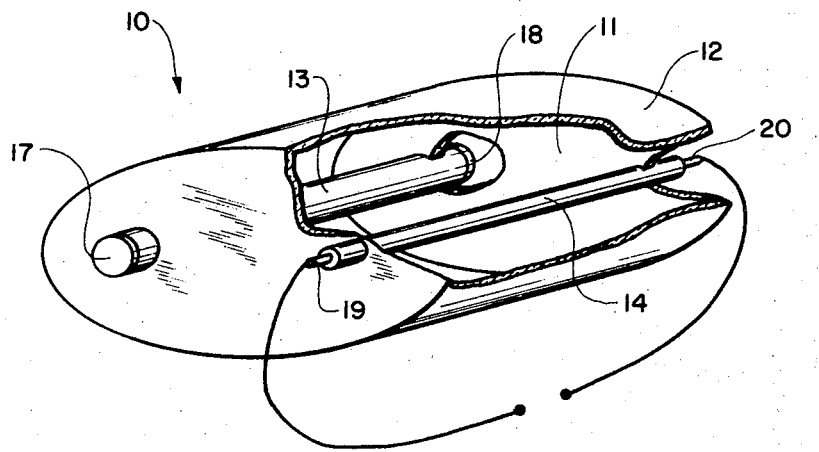

3,766,490

LU:ND:YAG LASER SYSTEM AND MATERIAL

BACKGROUND OF THE INVENTION

The present invention relates to lasers and more particularly to laser systems utilizing co-doped Nd:YAG laser materials.

Those concerned with the development of laser systems have long recognized the need for improving the efficiency of the laser materials used therein. It is generally well known that of all the various components normally used to construct a laser, e.g. cavities, pumps, mirrors, etc., a significant source of inefficient operation may be directly or indirectly attributed to the characteristics of the laser materials. For example, it is well known that the efficiency of a laser system in inversely related to the temperature of the laser material, i.e. when the temperature goes up the efficiency goes down. One important cause of temperature increases is due to the absorption by the host materials of radiation which does not contribute to the population inversion. In order to reduce such unwanted absorptions, filters are normally mounted between the radiation source and the laser material. This solution has not always proved entirely satisfactory, however, because such filters, while removing the unwanted radiations, also block some desirable radiations which could be used to increase the population inversion.

SUMMARY OF THE INVENTION

One of the most frequently used optically pumped laser materials is neodymium doped yttrium aluminum garnet (Nd:YAG). Some of the characteristics of Nd:YAG lasers which make them popular are (1) the output, which is in the near infrared, is not visible to the human eye and can be easily detected by standard detectors, (2) these lasers can be efficiently used in either pulse or CW operation, and (3) these lasers operate as an efficient four level laser system. However, it is generally well known that Nd:YAG laser systems always include filtering devices in the pump cavity to remove unwanted ultraviolet radiations because of the absorption characteristics of the Nd:YAG laser materials. As explained above, a significant amount of desirable radiation is also removed by these filters. If the filters were not used, the Nd:YAG laser materials would heat up to a point which would critically reduce the efficiency.

In order to solve this problem and to improve the efficiency of Nd:YAG lasers, the present invention contemplates the co-doping of the Nd:YAG crystals with lutetium (Lu) such that the resulting Lu:Nd:YAG crystals are rendered substantially transparent to a significant portion of the ultraviolet spectrum while retaining all of the desirable features of Nd:YAG lasers. In fact, it has been found that radiation in the ultraviolet range from 3800A to 2400A actually enhances population inversion in the Lu:Nd:YAG crystal, thereby resulting in higher efficiencies. Therefore, instead of filtering ultraviolet radiation as present laser systems do, the Lu:Nd:YAG laser system of the present invention has no filters. Actually, a pump source radiating a significant amount of ultraviolet radiation would be desirable in these systems.

It is therefore a primary object of the present invention to provide a high efficiency Lu:Nd:YAG laser system with a resulting reduction in size, weight and pump power normally required in Nd:YAG lasers.

DESCRIPTION OF THE DRAWINGS

Other objects and features of the invention will become apparent to those skilled in the art as the disclosure is made in the following description of a preferred embodiment of the invention as illustrated in the accompanying sheet of drawing which shows a diagrammatic perspective view of a preferred embodiment of the invention.

DETAILED DESCRIPTION OF THE PREFERRED EMBODIMENT

Referring now to the drawing, there is shown a laser system 10 having a pump cavity 11 which includes a reflector 12 shaped in the form of a right elliptical cylinder. Reflector 12 may be made from any well known reflective material such as gold, aluminum or silver deposited on the inside surface of the rigid housing. Mounted colinearly with the foci of the elliptical pump cavity 11 are the laser rod 13 and the pump source 14.

The pump source 14 is a high pressure discharge krypton or xenon lamp operated at a high current density for maximum radiation brightness. There are no filters, ultraviolet or otherwise, mounted in the pump cavity 11 and the reflective surfaces of reflector 12 may have a high ultraviolet reflection coefficient.

The laser rod 13, besides being mounted at a focus of the pump cavity 12, is also mounted in a laser resonant cavity formed by the mirrors 17 and 18 one of which is partially reflective to provide an output. When operating the laser system 10, the pump source 14 is energized by an electrical signal applied to electrodes 19 and 20 which causes the pump source 14 to radiate over a broad spectrum. Because of the elliptical shape of reflector 12, almost all of the radiation which is emitted radially from source 14 will be incident upon rod 13 after being reflected by reflector 12. Some of the radiation emitted from source 14 will be incident upon rod 13 without any reflection while some more of the emitted radiation will be absorbed by reflector 12 and will never reach rod 13.

The radiation incident upon rod 13 will in general be either absorbed or transmitted by rod 13. Of the radiation absorbed by rod 13, some will contribute to the usual population inversion required for laser action while the remainder will be converted to heat. As explained above, the higher the temperature of rod 13, the less populated will be the ground state and the more populated will be the upper energy states with the particle distribution such that the desired population inversion is reduced.

In order to improve the efficiency of such laser systems and in particular YAG type laser systems, it becomes important to prevent that portion of the pump radiation which does not contribute to the population inversion from being absorbed by the laser rod 13. In the past, as mentioned above, filters have been inserted between the pump source 14 and the laser rod 13 to prevent the absorption of unwanted radiations. More specifically, in the case of the YAG type lasers, pump energy in the ultraviolet portion of the spectrum between 3800A and 2400A has contributed substantially to temperature increases and the removal of this ultraviolet energy has been critical to the proper operation of YAG type laser systems.

The laser system of the present invention utilizes a co-doped Lu:Nd:YAG material for the rod 13. In other words, the rod 13 is basically a YAG crystal used as a host in which the Lu and Nd are distributed and are located at the crystal sites normally occupied by Y. It has been found that, if the Lu/Nd ion ratio in the Lu:Nd:YAG material is between 2.0 and 2.4, then, the amount of radiation absorbed by the rod 13 which does not contribute to the population inversion will be relatively small and the use of filters will not be needed. The co-doping of the Nd:YAG crystal with Lu to the ratio specified above in effect renders the crystal substantially transparent to radiation in the ultraviolet range. It has also been found that of the relatively small amount of ultraviolet radiation absorbed by the Lu:Nd:YAG rod 13, a substantial portion thereof contributes to the population inversion.

A specific example of a Lu:Nd:YAG laser material actually used for rod 13 had a Nd density of $2.05 \times 10^{20}$ atoms/cm$^3$ and a Lu/Nd ratio of 2.4. A 50mm rod of this material having a diameter of 5mm exhibited a 40 percent increase in efficiency of pulsed laser operation over an identically shaped Nd:YAG rod having a Nd density of $2.05 \times 10^{20}$ atoms/cm$^3$. Spectroscopic studies showed substantially identical absorption characteristics for both samples except in the ultraviolet range. The Lu:Nd:YAG sample showed significantly less absorption in the ultraviolet region then did the Nd:YAG sample. Many other Lu:Nd:YAG samples were studied having Lu/Nd ratios ranging between 1 and 5. A significant increase in efficiency was evident for only those Lu:Nd:YAG samples having the Lu/Nd ratio in the range from 2.0 to 2.4. A sharp decrease in efficiency was observed for samples outside this range.

It was determined that the calculated volumetric size compensation ratio Lu/Nd for the Lu:Nd:YAG samples is 2.33. In other words, the YAG crystal lattice when doped with Nd is distorted because Nd has a relatively large atomic radius. Such distortion produces internal stresses and strains causing splitting of the energy levels and thereby increasing the probability of radiation absorption over a broader band. The co-doping of the Nd:YAG crystal lattice with Lu compensates for this distortion because the Lu has a relatively small atomic radius. The distortion or internal strain is a minimum when the Lu/Nd ratio is 2.33 according to the calculations noted above. It also follows that the energy level splitting will also be a minimum as will the probability of radiation absorption when the Lu/Nd ion ratio is substantially 2.33 or in the range from 2.0 to 2.4 according to the results of the above noted theoretical calculations and the more practical experimental evidence.

It should be understood, of course, that the foregoing disclosure relates to a preferred embodiment of the invention and that modifications may be made therein without departing from the spirit and the scope of the invention as set forth in the appended claims.

What is claimed is:

1. A laser system comprising:

a laser resonant cavity;

a laser rod mounted in said laser resonant cavity;

a pump source means for radiating pump energy over a broad spectrum, said broad spectrum including a substantial amount of energy extending over the wavelength range of 3,800 A. to 2,400 A;

a pump chamber having said pump source means and said laser rod mounted therein for directing substantially all of said radiation over said broad spectrum from said pump source means to said laser rod; and said laser rod being a co-doped Lu:Nd:YAG crystal having a Lu/Nd ratio in the range of substantially 2.0 to 2.4 atoms of Lu to atoms of Nd distributed in a YAG host crystal.

* * * * *